(12) United States Patent
Saran

(10) Patent No.: US 6,620,396 B2
(45) Date of Patent: Sep. 16, 2003

(54) METHOD OF REMOVING PHOSPHORUS FROM SLUDGE

(75) Inventor: Mohan S. Saran, Grand Island, NY (US)

(73) Assignee: Glenn Springs Holdings, Inc., Lexington, KY (US)

( * ) Notice: Subject to any disclaimer, the term of this patent is extended or adjusted under 35 U.S.C. 154(b) by 334 days.

(21) Appl. No.: 09/859,254

(22) Filed: May 17, 2001

(65) Prior Publication Data

US 2002/0187095 A1 Dec. 12, 2002

(51) Int. Cl.$^7$ ................................................ C01B 25/04
(52) U.S. Cl. ...................... 423/322; 210/710; 210/906
(58) Field of Search ..................... 423/322; 210/710, 210/906

(56) References Cited

U.S. PATENT DOCUMENTS

| | | | |
|---|---|---|---|
| 3,442,621 A | 5/1969 | Hinkebein | 23/223 |
| 3,615,218 A * | 10/1971 | Post et al. | 423/322 |
| 4,481,176 A * | 11/1984 | Dodson et al. | 423/322 |
| 4,686,094 A * | 8/1987 | Roberts et al. | 423/322 |
| 4,717,558 A | 1/1988 | Beck et al. | 423/322 |
| 5,002,745 A | 3/1991 | Michaels et al. | 423/322 |
| 5,089,142 A | 2/1992 | Turunc | 210/728 |
| 5,514,352 A * | 5/1996 | Hanna et al. | 423/322 |
| 6,451,276 B1 * | 9/2002 | Saran et al. | 423/322 |

* cited by examiner

*Primary Examiner*—Wayne A. Langel
(74) *Attorney, Agent, or Firm*—Richard D. Fuerle

(57) ABSTRACT

A method of recovering elementary phosphorus from an aqueous sludge containing about 1 to about 15 wt % dispersed particles of phosphorus is disclosed. To the sludge is added about 1 to about 20 wt %, based on the weight of the phosphorus present in said sludge, of a phosphate salt that has the general formula:

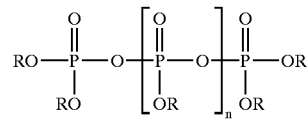

where R is an alkali metal or ammonium and n is 0 to 30. The phosphorus in the sludge is melted and the solids in the sludge are separated from liquid phosphorus and water. Liquid phosphorus is then separated from the water.

20 Claims, No Drawings

METHOD OF REMOVING PHOSPHORUS FROM SLUDGE

BACKGROUND OF THE INVENTION

This invention relates to a method of recovering phosphorus from phosphorus-containing sludge. In particular, it relates to the treatment of this sludge with a phosphate salt which, on further processing, causes the phosphorus particles to coalesce into a separate phosphorus phase.

Sludge from manufacturing phosphorus can contain small amounts of phosphorus and dirt particles dispersed in an aqueous phase. The phosphorus should be removed from the sludge for both economic and environmental reasons. The phosphorus cannot be recovered from the sludge by filtration because most of the filtered phosphorus stays dispersed in water. Phosphorus can be recovered from this sludge by heating the sludge in the absence of air to evaporate the water, but that is uneconomic. Various substances can be added to the sludge to cause the phosphorus particles to coalesce but, until now, this has not been very effective.

SUMMARY OF THE INVENTION

I have discovered that the addition of certain phosphate salts to a heated aqueous phosphorus-containing sludge followed by filtration causes the dispersed phosphorus particles to coalesce and form a continuous phosphorus layer. The phosphorus can then be easily separated and recovered as a valuable product.

This is a very cost-effective process for recovering phosphorus as a valuable product from sludge and for converting the sludge into an inert non-hazardous waste for disposal.

DESCRIPTION OF THE PREFERRED EMBODIMENTS

This invention is applicable to aqueous sludges containing dispersed phosphorus particles as a discontinuous phase. The amount of phosphorus in the sludge should be at least about 1 wt % (based on sludge weight) because it is usually not economical to treat sludges containing less phosphorus by the method of this invention. Sludges that contain more than about 15 wt % phosphorus and have a continuous phosphorus phase can usually be treated more economically by other methods. Preferably, the sludge contains about 5 to about 10 wt % phosphorus. The phosphorus is present as water-dispersed particles of $P_4$ that are too small to readily settle out. Particles of "dirt" and other charged impurities may keep the phosphorus particles in suspension and prevent them from agglomerating. The "dirt" is a mixture of a variety of substances, such as coke, sand, phosphate rock, etc.

The aqueous sludge is placed in a tank and a phosphate salt that has the general formula

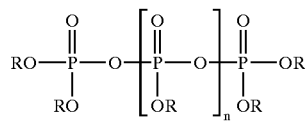

is added to it, where R is an alkali metal or ammonium and n is 0 to 30. Preferably, n is 0 to 12 and R is sodium or potassium as many of those salts are commercially available; sodium salts are most preferred as they are less expensive. Many of the phosphate salts are commercially available and those that aren't can be made using processes similar to the those used to prepare the commercially available phosphate salts. The preferred phosphate salts are sodium tripolyphosphate (STPP), tetrasodium pyrophosphate (TSPP), and sodium hexametaphosphate (SHMP), which have the respective formulas:

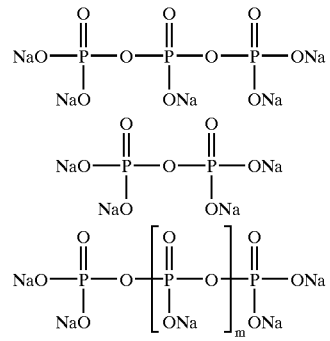

where m is 6 to 30. These phosphate salts are preferred as they have been found to work well and are commercially available.

The amount of phosphate salt added to the sludge should be about 1 to about 20 wt %, based on the weight of the phosphorus in the sludge, as less is not very effective and more is usually unnecessary and without additional benefit; preferably, about 2 to about 10 wt % of the phosphate salt is added.

Before or after the addition of the phosphate salt, the sludge is heated above the melting point of phosphorus, 44.1° C.; preferably, it is heated to about 50 to about 70° C. It is preferable to stir for about 5 to about 60 minutes while heating. The sludge is then filtered, preferably under a pressure of about 10 to about 100 psi, or it can be centrifuged. Water and the liquid phosphorus in the aqueous phase pass through as the filtrate and the dirt forms a filter cake. Filtered or centrifuged phosphorus particles agglomerate or coalesce in the aqueous phase and sink to the bottom of the tank, forming a liquid phosphorus phase. This phosphorus phase can be easily separated from the aqueous phase by gravity draining, pumping it out, decantation of the water, or other techniques. The process can be run continuously or in batches.

The following examples further illustrate this invention:

EXAMPLE 1

In a series of experiments, $P_4$ sludge (100 g) was charged into a one-liter flask equipped with a stainless steel stirrer having a variable speed motor. The flask was placed in a large Pyrex water bath which was heated with an immersion heater to 65 to 70° C. Once the contents of the flask had reached 60° C., the temperature was maintained, an additive was added, and the mixture was stirred. After stirring, the contents of the flask were centrifuged or filtered while being kept at a temperature above the melting point of phosphorus. Dirt in the sludge formed a filter cake and the filtrate of phosphorus and water separated into an aqueous phase on top and a phosphorus phase on the bottom. Phosphorus was recovered after decanting the aqueous phase. The collected phosphorus and the filter cake were weighed and analyzed for composition. The recovered phosphorus was more than 99% pure. The following table gives the results:

| | Sludge | | Additive | | Stirring | | Phosphorus | | Filter Cake | | |
|---|---|---|---|---|---|---|---|---|---|---|---|
| Example | % P | % Dirt | Name | Weight (g) | Rate (rpm) | Time (min) | Weight (g) | % Rec. | Weight (g) | % P | % Dirt |
| 1 | 9.7 | 26.6 | None | 0 | 0 | 60 | 3.5 | 36 | 53.7 | 10.3 | 46.6 |
| 2 | 9.6 | 25.9 | None | 0 | 200 | 60 | 2.6 | 27 | 51.7 | 9.6 | 43.8 |
| 3[a] | 9.5 | 26.1 | SHMP | 0.2 | 100 | 5 | 4.8 | 51 | 51.6 | 8.7 | 50.5 |
| 4[b] | 10.6 | 30.4 | SHMP | 0.5 | 56 | 60 | 5.6 | 53 | 60.8 | 7.7 | 48.6 |
| 5[a] | 9.7 | 26.2 | SHMP | 0.5 | 100 | 5 | 5.5 | 57 | 51.9 | 6.9 | 49.9 |
| 6[c] | 9.6 | 25.8 | SHMP | 0.5 | 200 | 60 | 4.6 | 48 | 52.8 | 8.8 | 48.6 |
| 7 | 9.8 | 26.8 | SHMP | 1.0 | 0 | 0 | 5.6 | 57 | 50.9 | 6.4 | 52.1 |
| 8[d] | 9.9 | 29.1 | SHMP | 1.0 | 56 | 60 | 6.5 | 66 | 56.5 | 4.7 | 49.7 |
| 9 | 10.2 | 27.0 | SHMP | 1.0 | 100 | 5 | 5.9 | 58 | 51.3 | 7.0 | 52.1 |
| 10 | 9.7 | 27.1 | SHMP | 1.0 | 100 | 15 | 5.6 | 58 | 53.9 | 6.3 | 50.0 |
| 11 | 9.6 | 26.7 | SHMP | 1.0 | 100 | 30 | 5.6 | 58 | 52.6 | 6.6 | 50.6 |
| 12 | 9.7 | 27.0 | SHMP | 1.0 | 100 | 60 | 6.3 | 65 | 49.7 | 5.3 | 52.2 |
| 13 | 8.9 | 24.8 | SHMP | 1.0 | 200 | 60 | 5.2 | 58 | 48.5 | 7.5 | 48.5 |
| 14 | 9.9 | 28.9 | SHMP | 1.5 | 56 | 60 | 6.5 | 66 | 56.0 | 5.7 | 51.2 |
| 15 | 15.2 | 31.1 | SHMP | 1.0 | 56 | 60 | 11.7 | 84 | 56.3 | 6.2 | 47.8 |
| 16 | 15.2 | 31.1 | SHMP | 1.5 | 56 | 60 | 10.8 | 71 | 48.8 | 6.3 | 61.7 |
| 17[e] | 10.8 | 27.0 | STPP | 1.0 | 100 | 30 | 5.9 | 55 | 50.7 | 7.9 | 53.1 |
| 18[e] | 10.2 | 26.7 | TSPP | 1.0 | 100 | 30 | 6.1 | 60 | 53.7 | 5.9 | 46.1 |
| 19 | 9.7 | 26.4 | TSPP/SHMP | 0.5/0.5 | 100 | 5 | 5.6 | 58 | 52.7 | 7.8 | 54.0 |
| 20 | 10.4 | 26.6 | STPP/SHMP | 0.5/0.5 | 100 | 5 | 5.2 | 50 | 53.1 | 7.1 | 49.9 |
| 21 | 15.2 | 31.1 | CrO$_3$ | 1.0 | 56 | 60 | 5.1 | 34 | 62.4 | 11.2 | 48.9 |
| 22 | 15.2 | 31.1 | H$_2$O$_2$ 30% | 3.4 | 56 | 60 | 4.1 | 27 | 56.5 | 15.1 | 47.1 |

[a]average of 3 runs
[b]average of 5 runs
[c]average of 2 runs
[d]average of 4 runs
[e]less coalescence; about half of the filtered phosphorus consisted of separate beads These examples show that only about 30 wt % of the phosphorus was recovered when the sludge was filtered without the use of an additive, or when hydrogen peroxide or chromic acid were used as additives. It was possible to recover about 60 wt % phosphorus, however, when the phosphate salts of this invention were used. Greater coalescence of the phosphorus was observed when SHMP was used as the additive.

I claim:

1. A method of recovering elementary phosphorus from an aqueous sludge containing about 1 to about 15 wt % dispersed phosphorus, comprising (A) adding to said sludge about 1 to about 20 wt %, based on the weight of the phosphorus present in said sludge, of a phosphate salt that has the general formula:

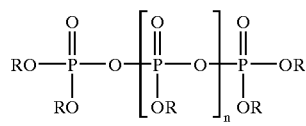

where R is an alkali metal or ammonium and n is 0 to 30;

(B) melting the phosphorus in said sludge;
(C) separating liquid phosphorus and water from solids in said sludge; and
(D) separating liquid phosphorus from water.

2. A method according to claim 1 wherein said dispersed phosphorus particles are too small to settle out.

3. A method according to claim 1 wherein said phosphate salt is sodium tripolyphosphate.

4. A method according to claim 1 wherein said phosphate salt is tetra sodium pyrophosphate.

5. A method according to claim 1 wherein said phosphate salt is sodium hexametaphosphate.

6. A method according to claim 1 wherein R is sodium.

7. A method according to claim 1 wherein R is potassium.

8. A method according to claim 1 wherein n is 0 to 12.

9. A method according to claim 1 wherein said sludge is heated to a temperature of about 50 to about 70° C. to melt said phosphorus.

10. A method according to claim 1 wherein liquid phosphorus and water are separated from said sludge by filtration.

11. A method according to claim 1 wherein liquid phosphorus and water are separated from said sludge by centrifugation.

12. A method according to claim 1 wherein liquid phosphorus is separated from water by gravity draining.

13. A method of treating an aqueous sludge in which is dispersed about 5 to about 10 wt % elementary phosphorus particles, comprising (1) adding to said sludge about 1 to about 20 wt %, based on the weight of the phosphorus present in said sludge, sodium tripolyphosphate, tetrasodium pyrophosphate, or sodium hexametaphosphate;

(2) heating said sludge above the melting point of said phosphorus, whereby said phosphorus melts;

(3) filtering said sludge to separate liquid phosphorus and water from solids; and (4) separating said liquid phosphorus from water.

14. A method according to claim 13 wherein said phosphate salt is sodium tripolyphosphate.

15. A method according to claim 13 wherein said phosphate salt is tetrasodium pyrophosphate.

16. A method according to claim 13 wherein said phosphate salt is sodium hexametaphosphate.

17. A method according to claim 12 wherein the amount of said sodium tripolyphosphate, tetrasodium pyrophosphate, or sodium hexametaphosphate added is about 2 to about 10 wt %.

18. A method of separating elementary phosphorus from sludge containing about 5 to about 10 wt % dispersed dirt-coated phosphorus particles too small to settle out, comprising
(1) adding to said sludge about 1 to about 20 wt %, based on the weight of the phosphorus present in said sludge, sodium hexametaphosphate;
(2) heating said sludge to about 50 to about 70° C.;
(3) filtering said sludge to separate solids therein from liquid phosphorus and water; and
(4) separating liquid phosphorus from water.

19. A method according to claim 18 wherein liquid phosphorus is separated from water by gravity draining.

20. A method according to claim 18 wherein the amount of said sodium hexametaphosphate added is about 2 to about 10 wt %.

* * * * *